Nov. 13, 1951
R. T. MURRAY
2,575,116
CUTTER HEAD STRUCTURE WITH HYDRAULICALLY
OPERATED CUTTER MOUNTINGS
Filed April 2, 1946
4 Sheets-Sheet 1
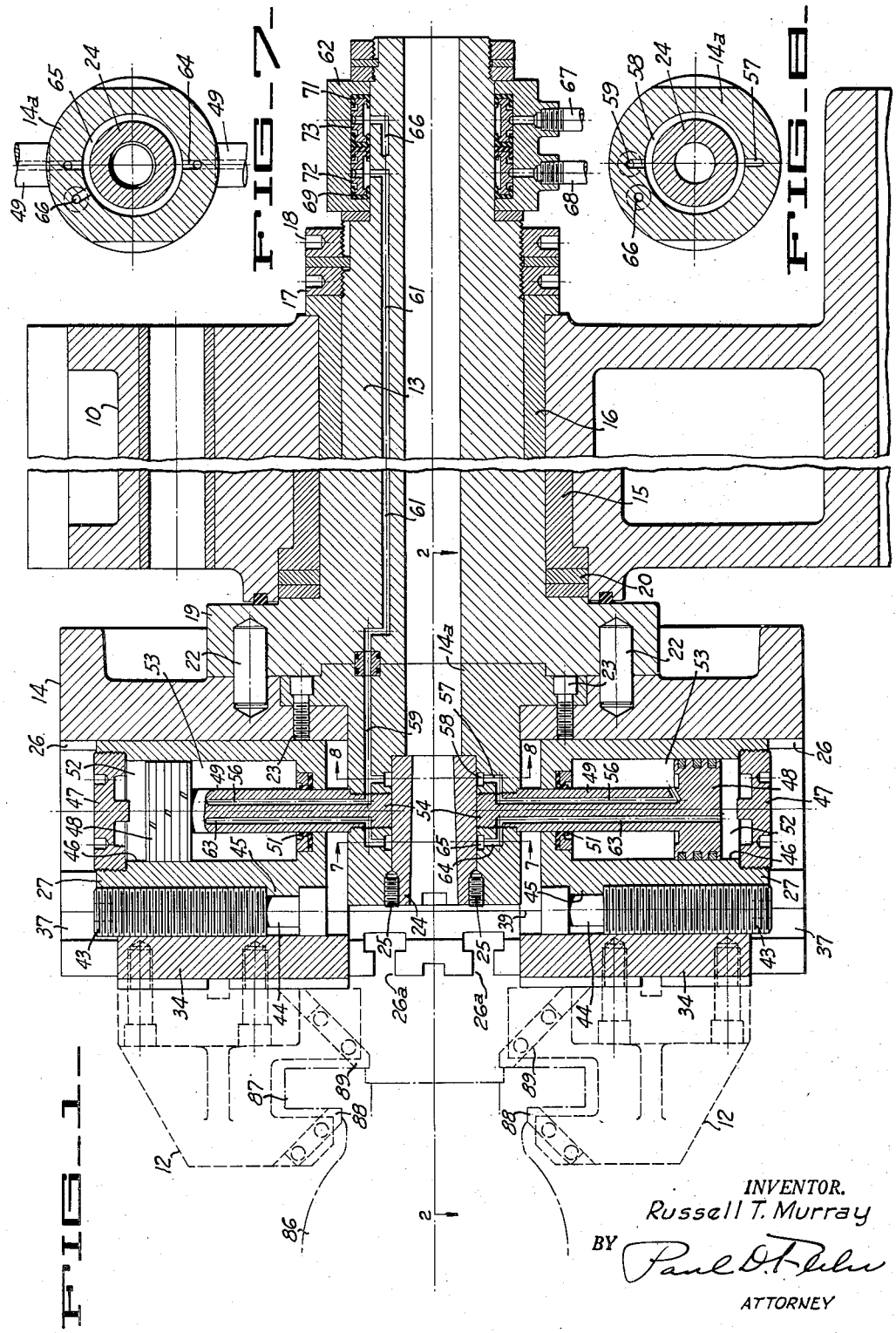
INVENTOR.
Russell T. Murray
BY
ATTORNEY

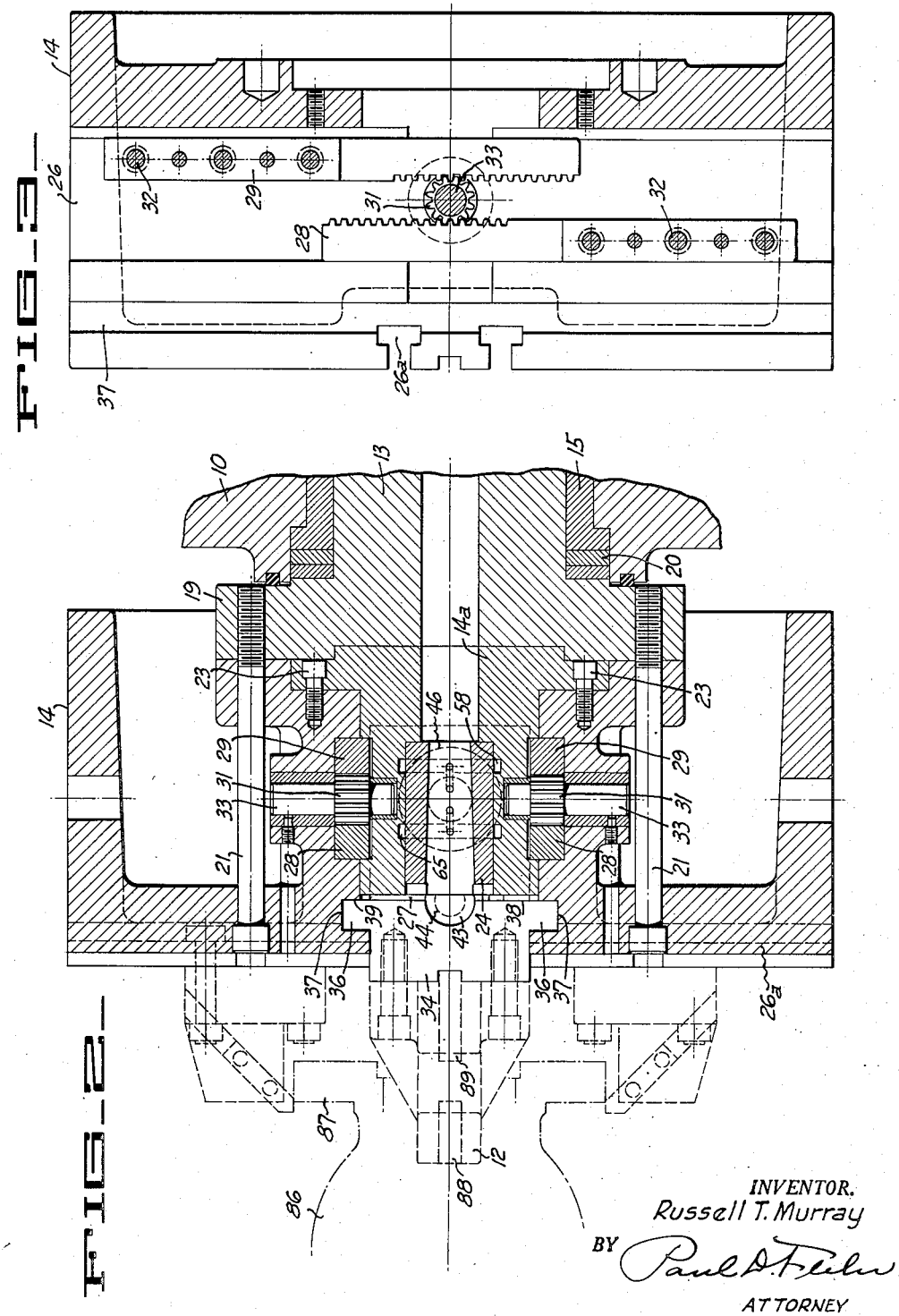

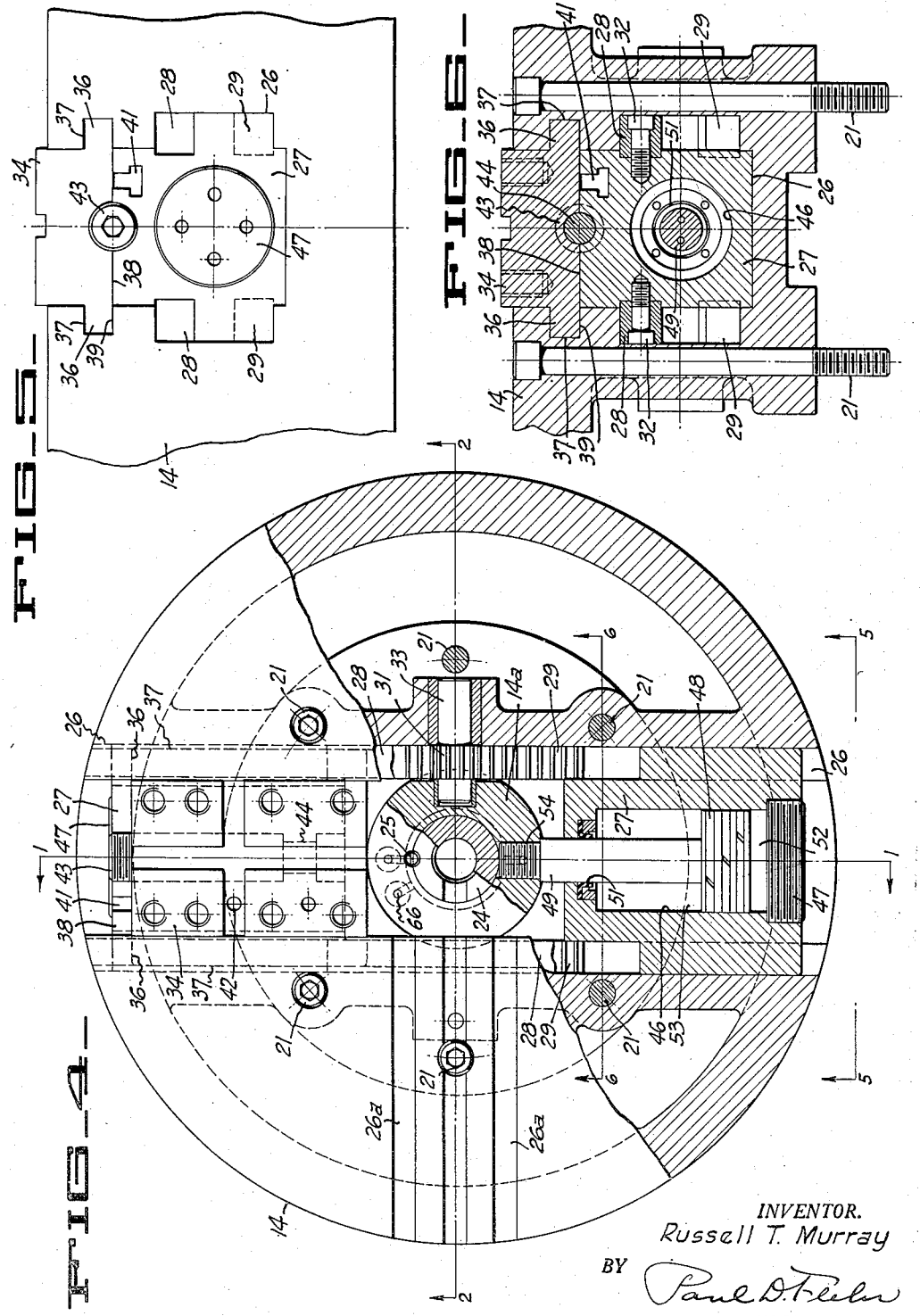

Nov. 13, 1951

R. T. MURRAY 2,575,116

CUTTER HEAD STRUCTURE WITH HYDRAULICALLY
OPERATED CUTTER MOUNTINGS

Filed April 2, 1946

INVENTOR.
Russell T. Murray
BY
ATTORNEY

Patented Nov. 13, 1951

2,575,116

UNITED STATES PATENT OFFICE 2,575,116

CUTTER HEAD STRUCTURE WITH HYDRAULICALLY OPERATED CUTTER MOUNTINGS

Russell T. Murray, El Cerrito, Calif., assignor to Grove Regulator Company, Oakland, Calif., a corporation of California Application April 2, 1946, Serial No. 659,004

5 Claims. (Cl. 82—20)

This invention relates generally to machines suitable for various metal machining operations.

In the past certain types of metal working machines have utilized so-called rotary cutter heads which generally carry a plurality of cutters controlled as to feed and capable of carrying out certain predetermined cutting operations upon the work. The cycling of such a head may be either semi or full automatic. In some instances the work is rotated while the head remains stationary, but where the work is of considerable size it is generally preferable to mount the work stationary and to provide for rotation of the head. Heads of this type which have been available in the past have not been capable of heavy duty cutting operations, and the degree of accuracy obtained has not always been as high as is frequently desired. In addition they have been relatively expensive, particularly with respect to the means employed for feeding the cutters against the work.

It is an object of the present invention to provide a cutting device of the above character which is capable of heavy duty machining operations to a high degree of accuracy.

A further object of the invention is to provide a cutting device of the above character which eliminates conventional complicated mechanical motion transmitting mechanism for feeding the cutters.

Further objects of the invention will appear from the following description in which the preferred embodiment of the invention has been set forth in detail in conjunction with the accompanying drawing.

Referring to the drawing:

Fig. 1 is a side elevational view in section illustrating a cutting device incorporating the present invention, and taken along the line 1—1 of Fig. 4.

Fig. 2 is a sectional view taken along the line 2—2 of Figs. 1 and 4.

Fig. 3 is a sectional view showing the means for insuring conjoint movement of the cylinders.

Fig. 4 is an end view of the cutting device, with the portions being removed and portions shown in section.

Fig. 5 is a detail view indicated by line 5—5 of Fig. 4.

Fig. 6 is a sectional detail taken along the line 6—6 of Fig. 4.

Fig. 7 is a sectional detail taken along the line 7—7 of Fig. 1.

Fig. 8 is a sectional detail taken along the line 8—8 of Fig. 1.

Fig. 9 is a view diagrammatically showing suitable hydraulic connections.

Fig. 9a shows the reversing valve 71 in a different position from that shown in Fig. 9.

The cutting device illustrated in the drawing consists generally of a head stock 10 which serves to support and journal the main body of the cutting head. The forward end of the assembly carries the blocks 12 which serve as mountings for cutting tools as will be presently described. In general the forward part of the head carries hydraulic means having direct rigid connections with the blocks 12 for feeding the blocks inwardly during a cutting operation, and for returning the same to their outer positions after a cut has been completed.

The main body can conveniently be formed of a number of parts including the stepped shaft part 13 and the forward part 14 which is formed to a larger diameter and which serves to carry the hydraulic means. Suitable bushings 15 and 16 are provided in the head stock 10 for journaling the shaft 13. The shaft 13 can be rotated by means such as a gear (not shown) attached to the same and driven by suitable means such as an electric motor and gear reduction. Also automatic or semi-automatic means can be provided for controlling the motor to obtain controlled speed as desired. In this connection it may be mentioned that in operations such as the facing of flanges, etc., it is desirable to feed the tool mounting blocks 12 at a constant rate, in conjunction with gradual increased driving speed for the head as the cutters advance inwardly to a smaller diameter.

The journaling of the shaft 13 should be such as to avoid end play. Thus thrust rings 20 are shown interposed between the end of the bushing 15 and an adjacent shoulder on the shaft part 13, and a take up adjustment is provided by way of threaded collars 17 and 18. Collar 18 can be keyed to a fixed adjusted position.

As convenient means for attaching the shaft and body parts 13, 14 the shaft is provided with a faced end flange 19 which is clamped to the body part 14 by screws 21 (Figure 2). Dowels 22 are provided for accurate relative location of these parts. To facilitate manufacture the body 14 can be provided with a separable hub part 14a, which is shown retained in place by screws 23. An inner sleeve 24 is fitted within the hub part 14a and retained by screws 25.

The body part 14 is machined to provide two radially extending guideways 26, which serve to accommodate the cylinder blocks 27. In Figure 4 cylinder blocks have been shown in the two opposed guideways, with two grooves 26a available for additional stationary blocks where it may be desired to carry out outer diameter turning.

Means is provided for interconnecting the cylinder blocks whereby they are constrained to move in unison. Preferably this means makes use of gear racks 28, 29 which cooperate with the pinions 31. There are two pairs of the racks 28, 29 (Figures 4 and 6) for two opposed cylinder blocks, with the racks 28 being attached to one block by screws 32, and the racks 29 similarly attached to the diametrically opposed cylinder block. Pinions 31 are carried by shafts 33 which in turn are journaled in the body 14 on a common axis passing through the center of the head as shown in Figure 4. The spacing between these pinions corresponds to the spacing between the two pairs of gear racks. Because the racks 28, 29 of each pair engage opposite sides of the corresponding pinion 31, the movement of the two piston blocks must be conjoint or synchronized and in opposite directions, that is either toward or away from each other.

Each cylinder block 27 adjustably carries a corresponding saddle 34 (Figure 6) which in turn serves to mount a cutter mounting block 12. Each saddle is independently guided within the body part 14 and is thus shown provided with flanges 36 which are accurately machined and which are slidably retained within the guideways 37. The flat faces 38, 39 of each cylinder block and saddle 34 are in interface contact, and these parts are retained together by suitable means such as a T slot 41 in the cylinder block, engaged by a retention bolt 42 carried by the saddle. A feed screw 43 is disposed in a bore provided half way in both these parts, with threaded engagement with the saddle. The screw portion 44 of reduced diameter is engaged by a lug 45 on the cylinder block, whereby upon turning the screw by application of a suitable tool or wrench, the corresponding saddle can be adjusted in a radial direction with respect to its associated cylinder block.

Each cylinder block is provided with a cylinder bore 46, the outer end of which is sealed by the threaded closure 47. A piston 48 is fitted into each cylinder bore and is carried upon the outer end of a rigid piston rod 49. The rod extends through the inner end of the cylinder block and is sealed with respect to the same by suitable means such as the cup washer 51. Closed spaces 52, 53 are thus provided on opposite sides of the pistons for receiving liquid under pressure. The inner ends 54 of the piston rods 49 are shown threaded and rigidly attached to the body part 14a.

A suitable arrangement of ducts and hydraulic connections are provided whereby liquid can be introduced into or permitted to exhaust from either of the two chambers 52, 53. Thus chambers 53 connect with the ducts 56 extending longitudinally through the piston rods 49, which in turn connect with ducts 57 in the body and the common circular duct 58. This system of ducts also connects with ducts 59 and 61, to the gland or slip ring 62. Chambers 52 similarly connect with the ducts 63 extending through the piston rods, which in turn connect with body duct 64 and circular duct 65. This arrangement likewise connects with ducts similar to ducts 59 and 61 extending longitudinally of the shaft 13 to the slip ring 62. The slip ring end of this duct is designated by 66. Liquid pipes 67, 68 connect with the slip ring 62, and within the ring suitable means is provided whereby pipes 67, 68 connect with the ducts 66, 61. For example such sealing means can employ cup washers 69, 71 arranged in pairs, and retained apart by spacer rings 72, 73.

Figure 9 diagrammatically illustrates suitable external hydraulic connections to the pipes 67, 68. In this instance the cylinder blocks, pistons and slip ring have been illustrated diagrammatically, to make clear the manner in which pipes 67, 68 are connected to the chambers on opposite sides of the pistons. Pipe 67 which connects to the outer chambers 52 also connects to a suitable flow control valve or variable orifice 76, which in turn connects by pipe 67a to the reversing valve 77. Pipe 68 connects to a counterbalance valve 78, which in turn likewise connects by pipe 68a to reversing valve 77. Valve 78 is shunted by the check valve 79. Reversing valve 77 has a discharge pipe 81 leading to the auxiliary liquid reservoir 82, and this reservoir connects to the inlet side of pump 83, which discharges through pipe 84 to the reversing valve 77. Reversing valve 77 is such that in one operating position, pipes 81 and 84 connect respectively to the pipes 68a and 67a. However, for the other operating position pipe 81 is connected to the pipe 67a and pipe 84 to the pipe 68a.

The purpose of the counterbalance valve 78 is to provide a predetermined amount of pressure in chambers 53 while liquid is being introduced into the chambers 53 to force the cylinder blocks and cutters inwardly. Thus in its construction and mode of operation it is similar to a back pressure regulator. For the other operating position of valve 77 the connections are reversed, that is the pump connects with the counterbalance valve 78 and the check valve 79, and the discharge pipe 81 connects with the flow control valve 76. Upon back flow through pipes 81 and 68a check valve 79 opens whereby liquid is exhausted from chambers 53 and liquid under pressure introduced into chambers 52. Valve 77 is preferably controlled automatically by a suitable timing cam, whereby the cylinder blocks are caused to move inwardly while the cutters are taking a cut, and whereby after the desired cut has been taken, the cylinder blocks and cutters are more rapidly returned to their outer positions to permit removal of the work. Flow control valve 76 is set at a suitable value to provide back pressure in chamber 52 while liquid is being introduced into chamber 53.

Operation of the complete machine can now be reviewed as follows: The work 86 to be operated upon, which may be provided with an end flange 87 to be faced upon opposite sides, is clamped upon a suitable table (not shown) of the machine. The head stock 10 is positioned on the frame or bed of the machine in such a manner that the forward end of the head is in suitable position for operating upon the work. If desired the attachment to the bed of the machine may be to a suitable carriage or like means whereby the position of the head can be adjusted in different directions relative to the work. Suitable cutters 88, 89 are secured to the tool mountings 12, and are adjusted in accordance with the cuts required. Assuming that one desires to carry out turning on a fixed diameter prior to a facing operation, stationary blocks and cutters are mounted in the grooves 26a. Assuming that the cylinder blocks are in their outermost positions, whereby the cutters 88, 89 are retracted from the work, a cutting cycle is started by commencing rotation of the head and advancing the head stock 10 to complete an outer turning operation. The reversing valve 77 is then positioned whereby liquid under pressure is applied to the chambers 53, to feed the cylinder blocks and thus the cutter mountings 12 inwardly at a controlled constant rate. The liquid in chambers 52 is displaced through the control valve 76, and ultimately by pipe 81 to the storage reservoir 82. Liquid from pump 83 being supplied to the chambers 53 can be regulated by adjusting the control valve 76, thereby regulating the rate of movement of the cutters. With the set-up of cutters illustrated in Figure 1, a double cut can be taken upon both the forward and rear faces of the flange 87. When the cuts have been completed the timing or cycling means employed reverses the positioning of valve 77 to that shown in Figure 9a, with the result that pump 83 now supplies liquid through control valve 76 to chambers 52, while at the same time liquid in chambers 53 is displaced and returned through check valve 79 to the reservoir 82. Movements of the cutters to initial outer positions can be relatively rapid compared to the rate of feed. In Figure 9 the cylinders are shown near the end of the inward feed and prior to changing the reversing valve 77 for retraction of the cutters.

Maintaining a substantial back pressure in chambers 52 while liquid is applied to chambers 53 for feeding the cylinder blocks inwardly, serves to insure positive even feed of the cutters under heavy duty cutting operations, without possibility of chatter. The cutter mountings 12 are capable of withstanding relatively heavy thrusts while taking a cut, due particularly to the fact that they are individually retained within adequate guideways. The cylinder blocks are likewise capable of imparting the type of positive steady feed desired because they are directly and rigidly attached to the saddles, and also because the pistons and associated piston rods are stationary and are rigidly attached to the body of the head.

In setting up the machine it will be evident that the feed screws 43 can be adjusted to vary the positioning of the saddles 34 with respect to the cylinder blocks as desired.

I claim:

1. In a metal working machine, a head structure adapted to be rotated, radially extending guideways formed on the head, cutter mounting means carried by said guideways, means including a pair of hydraulically operated cylinder and piston units for moving said mounting means, the pistons of said units being rigidly attached to the head and the cylinders of said units being rigidly and directly attached to said mounting means, and means including a pair of racks and a co-operating pinion for synchronizing movements of said mounting means.

2. In a metal working machine, a body structure adapted to be rotated, a pair of radially extending guideways formed on the body, a pair of cutter mounting saddles carried by said guideways and adapted to move radially along the same, a pair of hydraulically operated cylinder and piston units, the cylinders of said units being directly and rigidly attached to said saddles and the pistons of said units being rigidly attached to a central portion of the body, two pairs of gear racks attached to the cylinders and extending along paths located on opposite sides of the center of rotation of the head, and pinions journaled upon the body and engaging the racks of said pairs, whereby movements of the saddles in a radial direction are synchronized.

3. In a metal working machine, a head structure adapted to be rotated, a pair of radially extending guideways formed on the head, a pair of cutter mounting means each carried by a guideway, means including two pairs of hydraulically operated cylinder and piston parts for moving said mounting means, one of said parts of each pair being directly and rigidly attached to the mounting means, the axis of each pair extending adjacent to and parallel to its associated guideway, and means for synchronizing movements of the mounting means.

4. In a metal working machine, a head structure adapted to be rotated, a pair of radially extending guideways formed on the head, a pair of tool mounting means carried by said guideways, means including two pairs of hydraulically operated cylinder and piston parts for moving said mounting means, said piston part of each pair being rigidly attached to the head and said cylinder part being rigidly attached to the associated mounting means, each of said cylinder and piston parts being in close proximity with and extending parallel to the associated guideway, and means for synchronizing movements of the mounting means.

5. In a metal working machine, a head structure adapted to be rotated, a rotatable shaft to which the head is attached, a radially extending guideway formed on the head, a cutter mounting means slidably carried by the guideway, hydraulic operating means for said cutter mounting means comprising interfitting cylinder and piston parts carried by the head adjacent to and parallel to the guideway, said parts being formed to provide closed fluid chambers on both sides of the piston to thereby provide a double acting hyraulic operating means, said shaft being provided with ducts communicating with both said chambers for effecting hydraulic movement of said mounting means in either one of two directions.

RUSSELL T. MURRAY.

REFERENCES CITED

The following references are of record in the file of this patent:

UNITED STATES PATENTS

| Number | Name | Date |
|---|---|---|
| 632,230 | Berger | Sept. 5, 1889 |
| 1,146,193 | Miller | July 13, 1915 |
| 1,449,463 | Van Hamerveld | Mar. 27, 1923 |
| 1,454,121 | Lavoie | May 8, 1923 |
| 1,814,675 | Erickson | Oct. 24, 1930 |
| 1,986,862 | Svenson | June 8, 1935 |
| 2,383,050 | Esson | June 9, 1943 |
| 2,340,513 | Deuring | Feb. 1, 1944 |

FOREIGN PATENTS

| Number | Country | Date |
|---|---|---|
| 2,526 | Great Britain | 1853 |